July 20, 1943.                P. A. NOXON                2,324,718
                       COMPASS COMPENSATING MEANS
                         Filed Nov. 29, 1940           2 Sheets-Sheet 2

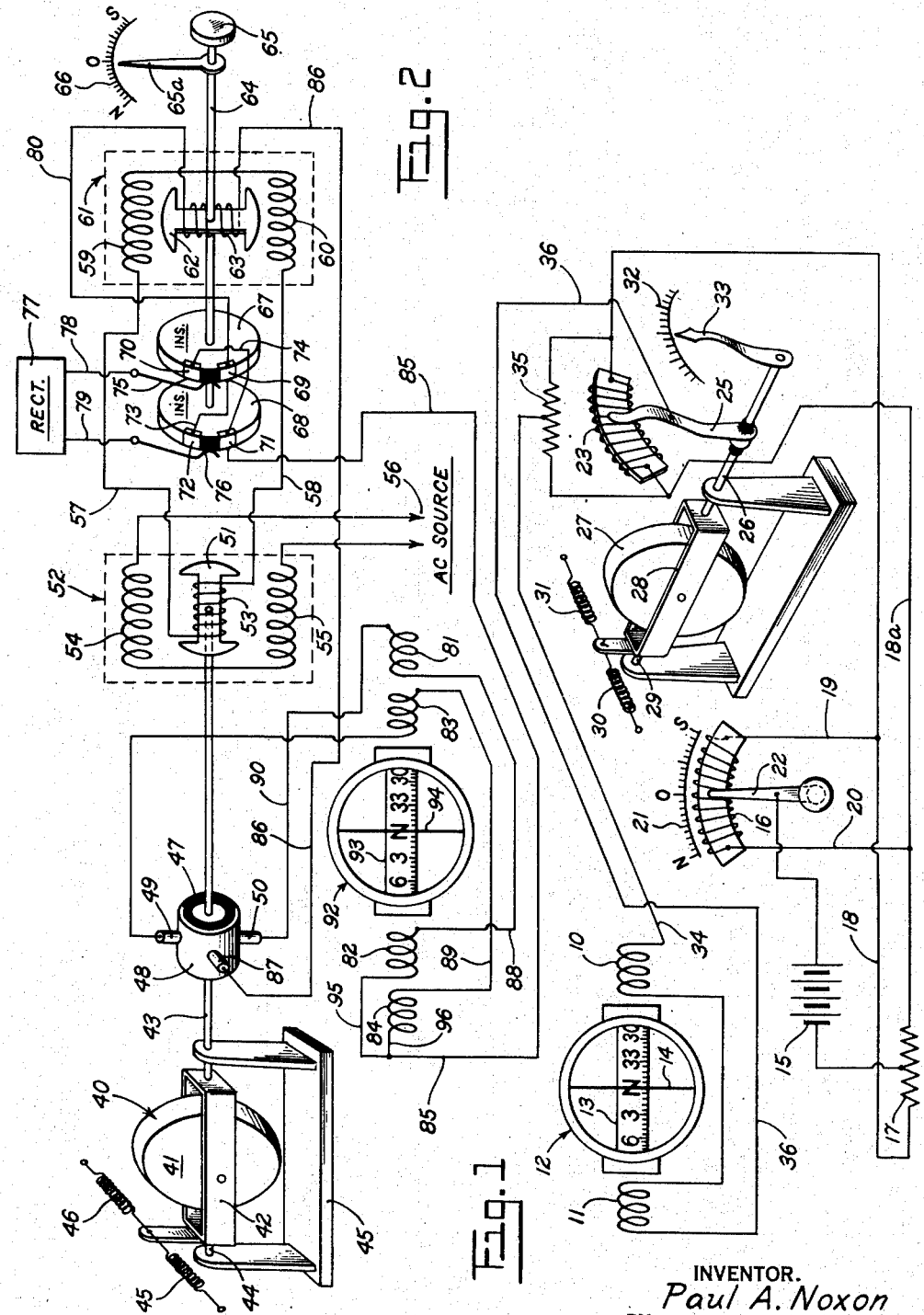

INVENTOR.
Paul A. Noxon
BY
ATTORNEYS.

Patented July 20, 1943

2,324,718

UNITED STATES PATENT OFFICE 2,324,718

COMPASS COMPENSATING MEANS

Paul A. Noxon, Tenafly, N. J., assignor to Bendix Aviation Corporation, Bendix, N. J., a corporation of Delaware Application November 29, 1940, Serial No. 367,847

11 Claims. (Cl. 33—225)

This invention relates generally to compasses and error compensation therefor, and more particularly to a method of and means for correcting for the "northerly turning error" to which compasses are subject during rapid turning of vehicles carrying such compasses.

The earth's magnetic field does not have a horizontal direction (except at the magnetic equator) but, on the other hand, develops an angular relation with respect to the earth, increasing in amount as the distance from the equator is increased. A freely-mounted balanced compass needle responds to this angular direction until at either of the earth's magnetic poles the needle assumes substantially a 90° relation with respect to the earth. Due to the angular disposition of the earth's magnetic field, vertical components of the field are introduced and act upon magnetic compasses during rapid turns thereof and are effective to disturb the compass reading. This error arising from the action of the vertical component of the earth's field upon magnetic compasses during rapid turns is referred to as the "northerly turning error."

It is an object of the present invention, therefore, to provide a novel method of and means for compensating for the "northerly turning error" of a compass, developed during turning of a vehicle incorporating the compass.

Another object is to provide a novel compensator for counteracting the disturbing effect developed by the vertical component of the earth's magnetic field upon a compass during turning thereof.

Another object is to provide novel compensating means for a magnetic compass for counteracting the effect of the vertical component of the earth's magnetic field developed during rapid turning of a craft carrying the compass, the compensating means being effective to introduce a counter force proportional to the turn of the craft.

Aanother object is to provide novel compensating means for a magnetic compass carried by an aircraft, whereby a local magnetic field is created at the compass proportional to the turn of the craft so as to overcome the disturbing effect developed upon the compass due to the vertical component of the earth's field acting during turning of the craft.

A further object of the invention is to provide novel compensating means for. a magnetic compass carried by an aircraft, whereby a local magnetic field is developed at the compass whose intensity is a function of the angle of turn of the craft and the angle of dip of the earth's magnetic field in the locality being traveled, so as to oppose the disturbing effect developed upon the compass due to the vertical component of the earth's magnetic field during turning of the craft.

Still another object of the invention is to provide a novel apparatus for use with a magnetic compass mounted upon an aircraft, whereby the apparatus may be adjusted for the particular angle of dip of the earth's magnetic field in the locality being travelled and thereafter acts automatically as a function of the turn or rate of turn of the craft to compensate for the "northerly turning error" developed upon the compass during turning of the craft.

A still further object of the invention is to provide a novel compensating device for a magnetic compass mounted on an aircraft which is adapted to provide a local magnetic field at the compass whose intensity is equal to the product of the intensity of the earth's magnetic field, the sine of the angle of dip, and the sine of the angle of turn of the craft so as to compensate for the effect of the vertical component of the earth's field upon the compass during turning of the craft.

The above and further objects and novel features of the invention will more fully appear from the following detailed description when read in connection with the accompanying drawings. It is to be expressly understood, however, that the drawings are for the purpose of illustration only and are not intended to define the limits of the invention, reference being had for this latter purpose to the appended claims.

Figure 1 is a diagrammatic view illustrating one form of the present invention,

Figure 2 is a diagrammatic view illustrating a second embodiment of the invention.

Figure 3:
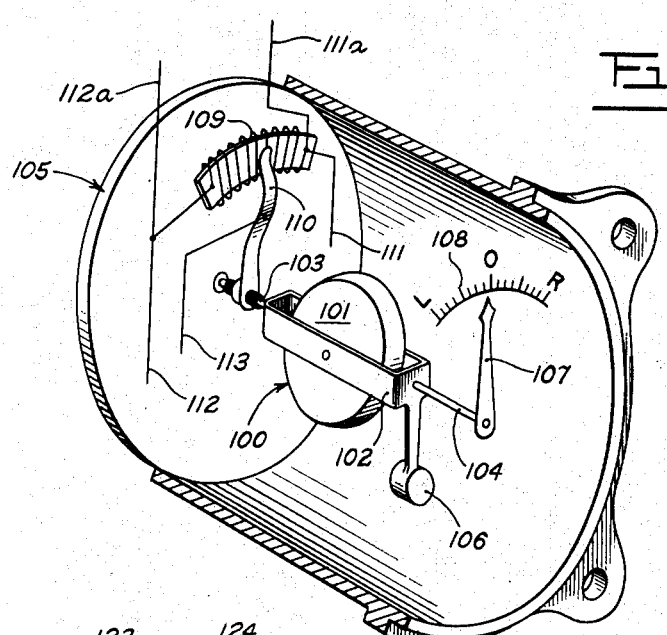
Figure 3 is another modification of the invention, and, Figure 4 is a still further modification of the invention.

"Northerly turning errors" acting on a magnetic compass mounted on an aircraft result from the presence of the vertical component of the earth's magnetic field during turning of the craft. During craft turning the compass needle or card is subjected to an accelerating force, $mwv$, in which $m$ is the mass of the card, $w$ the rate of turn in radians per second, and $v$ is the air speed in feet per second. The card tends to assume a position of equilibrium perpendicular to the resultant of the accelerating force and gravity. In the new position the card axis, known as the dynamic vertical, makes an angle θ which is equal to the arc tan $wv/g$ with the true vertical. The intersection of the plane of the card at the new position with the true horizontal plane is known as 'the "line of nodes." During a turn of the craft at a constant speed the line of nodes is parallel to the longitudinal axis of the card plane. The angle between it and the compass magnet is, therefore, the same as the compass reading.

Considering now the horizontal component of the earth's field, the angle formed between it and the line of nodes will obviously differ from the angle between its projection on the plane of the card and the line of nodes. This difference, however, is a very small part of the total turning errors and for all practical purposes will be considered negligible.

The vertical component, on the other hand, is the cause of most of the error and is the one that must be necessarily compensated. Its value is $H \sin \delta$, in which H is the intensity of the earth's field and δ is the angle of dip. Its projection on the plane of the card is, therefore, $H \sin \delta \sin \theta$ and is always perpendicular to the line of nodes.

The novel method of the invention to provide the necessary compensation is carried out by producing a magnetic field at the compass in any suitable manner in opposition to the projected portion of the vertical component of the earth's field, then controlling such opposing field in accordance with the turn or rate of turn of the craft on which the compass is mounted, and, if found necessary or desirable, also controlling such field in accordance with the angle of magnetic dip in the locality in which the craft is flying.

In accordance with the present invention, one form of novel means for carrying out the novel method for compensating for the effect of the vertical component upon the compass during craft turn comprises, as better shown in Figure 1 of the drawings, compensating coils 10 and 11 surrounding a magnetic compass 12 of any known type having a pair of magnets (not shown) carried by a pivoted compass rose or card 13 cooperating with a reference mark 14. Current flows in coils 10 and 11 in a manner to appear more fully hereinafter whereby a local magnetic field is created about the coils equal and opposite to the projected portion of the vertical component of the earth's field.

A suitable source of direct current, such as a battery 15, for example, is connected to a potentiometer resistor 16 through a resistor 17 by way of leads 18 and 18a and connecting leads 19 and 20 to permit control of the current applied to the system. Resistor 16 is provided with a suitable scale 21, indicating the angle of dip, and the resistor is so calibrated that by operation of a slidable contact member 22, connected to the other side of the source 15, the current delivered thereby is proportional to the sine of the angle of dip or sin δ.

The current delivered by resistor 16 from the source is applied to a second potentiometer resistor 23 by way of lead 18 and 18a and the resistor is further provided with a slidable contact arm 25 which is carried by a trunnion 26 of a rate of turn gyroscope having a rotor 27 provided with horizontal spin axis and mounted in a gimbal frame 28 having the trunnion 26 and a second trunnion 29 constrained against movement by suitable means such as springs 30 and 31, for example. The gyroscope is mounted by means of a suitable support upon the craft and may be further provided with a suitable scale 32 and pointer 33 for indicating the rate of turn of the craft. The rate of turn gyro must be a rate of turn meter in which the precession angle is substantially equal to the correct angle of bank.

During normal flight, the slider contact 25 is maintained in a central position or resistor 23 and no current flows therethrough. However, as soon as the craft turns, contact 25 moves over the resistor causing current flow to conductor 34 by way of leads 18 and 18a and resistor 35.

The amount of movement of contact 25 caused by the angular movement of frame 28 and trunnion 26 is equal to the angle θ. The resistor 23 is wound non-uniformly so that the resulting change in current is proportional to sin θ. The current flowing to the compensating coils 10 and 11 by way of conductor 34 is therefore proportional to sin δ sin θ. The resistance and number of turns of the compensating coils 10 and 11 is designed and chosen to the proper value so as to make the resulting field intensity at the compass 12 equal to $H \sin \delta \sin \theta$ (H being a substantially constant quantity). Current from coils 10 and 11 flows back to contact 25 by way of a suitable lead 36.

In operation, the latitude adjustment is set for the angle of dip in the locality in which the craft is flying by adjusting contact member 22 over resistor 16 and thereafter the operation of the system is automatic. During straight flight, the rate of turn gyroscope maintains the slider contact 25 in its central position upon resistor 23 and no current flows to the compensating coils 10 and 11.

During a turn of the craft the compass card is displaced from the horizontal plane and the vertical component of the earth's field acts thereon to disturb its reading. During the turn, however, the gyro rotor 27 precesses and thereby moves slider contact 25 over resistor 23 the correct amount to set up a magnetic field in coils 10 and 11 neutralizing the undesired projected portion of the vertical component of the earth's field and thus maintains the compass 12 to a true indication of direction.

A second embodiment of the invention for accomplishing the purpose above stated is shown in Figure 2 of the drawings. Generally designated at 40 is a rate of turn gyro having a rotor 41 provided with a horizontal spin axis mounted in a suitable gimbal frame 42 having trunnions 43 and 44 mounted for rotation in a suitable support member 45. The gyro is further resiliently constrained against movement by means such, for example, as springs 45 and 46.

Secured to the trunnion 43 for angular movement with gimbal 42 is a commutator 47 formed of non-conducting material and having a conducting segment 48 extending substantially 180° about the outer periphery thereof. A pair of brushes 49 and 50 are disposed 180° apart on the commutator for a purpose to presently appear.

Rigidly secured to an outward portion of trunnion 43 is a rotor 51 of a self-synchronous motor, generally designated at 52, having a rotor coil 53. The stator coils 54 and 55 of the motor are connected to a suitable source 56 of alternating current while rotor coil 53 is normally in a neutral position where no currents are induced therein.

During angular movement of gimbal 42, trunnion 43 and rotor 51, resulting from a turn of the craft, the current induced in the rotor coil 53 is proportional to sin θ since the amount of movement of rotor 51 and coil 53 by way of trunnion 43 is equal to the angle θ (the angle of turn).

The induced current of coil 53 is led by way of conductors 57 and 58 to the stator coils 59 and 60 of an adjusting motor generally designated at 61 likewise having a rotor 62 provided with a rotor coil 63 thereon. Rotor 62 is mounted upon a shaft 64 which is adapted for manual adjustment by means of a suitable knob 65. The adjustment is indicated by a pointer 65a attached to shaft 64 and cooperating with a scale 66 designating the angle of dip. Manual operation of shaft 64 moves the rotor 62 angularly an amount such that the currents induced in coil 63 during precession of the gyro are proportional to sin δ sin θ.

A reversible switch in the form of two commutators 67 and 68 is mounted upon an extension of manually operated shaft 64, the two commutators being locked to the shaft for movement in unison therewith and being formed of non-conducting material and provided with two pairs of conducting segments 69, 70 and 71, 72. Conducting segment 69 is connected with segment 72 by way of lead 73 while segment 70 is connected with segment 71 by way of lead 74. Two brushes 75 and 76 may normally rest between segments 69, 70 and 71, 72 and connect with a suitable rectifier 77 by way of leads 78 and 79. The purpose of switch 67, 68 is to provide for reversal of the rectified current output to the compensating coils in accordance with the direction of the angle of dip, depending upon whether the craft is above or below the equator.

The current induced in rotor coil 63 flows by way of lead 80 through segments 69, lead 73, segment 72, brush 76 and lead 79 to one side of rectifier 77 and out therefrom by way of lead 78, brush 75, segment 70, lead 74, segment 71, to lead 85 and compensating coils 81, 82, and 83, 84 when the knob 65 and pointer 65a have been set for an N angle of dip bringing brushes 75 and 76 to contact segments 70, 72. With a setting for an S angle of dip, current from rotor coil 63 flows to segment 69, brush 75 (brushes 75 and 76 in this position contacting segments 69 and 71), lead 78 to the rectifier and outwardly therefrom through lead 79, segment 71 to lead 85 and the compensating coils, flow of current in this case at the output of the rectifier being reversed. The opposite side of rotor coil 63 connects by way of lead 86 with a brush 87 on commutator 47 disposed normally in a position intermediate brushes 49 and 50.

Compensating coils 81, 82 connected by way of lead 88 are arranged in an opposed relation to coils 83, 84 connected electrically by way of lead 89. Coil 81 connects electrically with brush 50 by way of lead 90 while coil 83 connects with brush 49 by way of lead 91. One side of the coils is thus directly placed in circuit with one side of rotor coil 63 by way of lead 86 and brush 87 and with the other side of coil 63 by having the opposite ends of coils 82 and 84 connected by leads 95 and 96 with lead 85 and the reversible switch. The coils surround a magnetic compass generally designated at 92 having a compass rose or card 93 cooperating with an index or reference 94.

With angular movement of frame 42 and trunnion 43 in one direction, brush 49 moves away from segment 48 of commutator 47 and current passes from lead 86 to brush 50 and coils 81, 82, while during angular movement in the opposite direction, brush 50 moves away from segment 48 and current flows between brushes 87 and 49 through coils 83 and 84.

In operation, the form of the invention of Figure 2 is substantially the same as that described in connection with the structure of Figure 1. The latitude adjustment is set for the angle of dip (the latter angle varying substantially from 58° to 78° between the southern and northern borders of the United States) in the locality in which the craft is flying by angularly moving shaft 64, pointer 65a, and rotor 62 and its coil 63 by means of knob 65 and thereafter the operation of the system is automatic. During straight flight, the rate of turn gyroscope maintains the commutator 47 and rotor 51 with its coil 53 in a normal zero position whereby no currents are induced in rotor coil 53 and consequently no current is communicated to the compensating coils of the magnetic compass 92.

During a turn of the craft, the compass card 93 is displaced from the horizontal plane and the vertical component of the earth's field acts thereon to disturb its reading. At the time of the turn, however, the gyro rotor 41 precesses in a direction depending upon the direction of turn to angularly displace commutator 47 and rotor 51 with coil 53. The amount of angular movement of rotor and coil 53 is equal to θ and the currents induced in coil 53 due to the a. c. current flow in stator coils 54 and 55 are proportional to sin θ. The current of coil 53 flows to stator coils 59 and 60 of the adjusting motor and the latter is so designed and constructed that since rotor 62 and its coil 63 have already been moved an amount equal to sin δ the induced current in coil 63 will be proportional to sin δ sin θ. The output current of coil 63 is rectified by means of rectifier 77 and flows to compensating coils 81, 82, or 83, 84, depending upon the setting of knob 65. The resistance and number of turns of the coils are properly designed to make the resulting field intensity at the compass equal to H sin δ sin θ. The local field thus produced neutralizes the undesired projected portion of the vertical component of the earth's field and holds the compass 92 to a true indication of direction.

Figure 4:
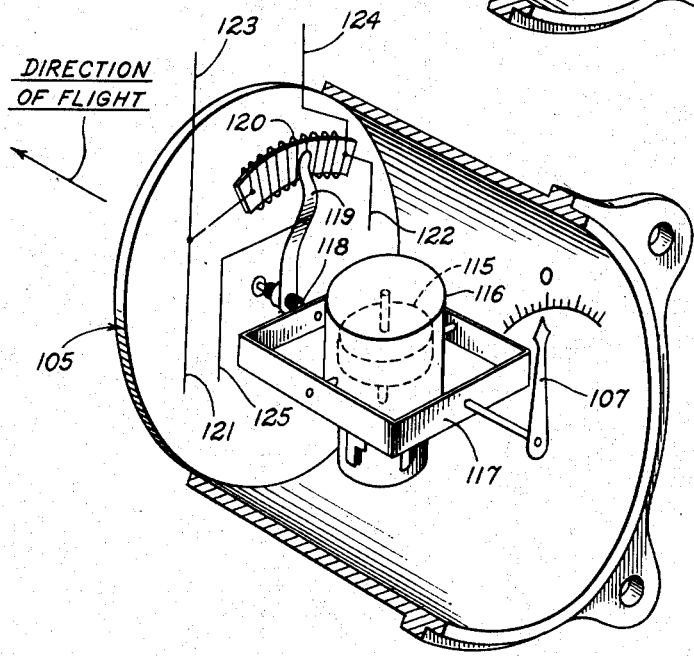

During a craft turn such as, for example, a "barrel roll" no bank angle exists and to make certain that the proper compensating field is at all times provided at the compass 12 or 92 of Figures 1 and 2 at such conditions the structures of Figures 3 and 4 are provided. With the use of the latter structures the compensating field neutralizing the effect of the vertical component of the earth's magnetic field will at all times depend upon the angle of bank being traversed by the craft.

Referring now more particularly to Figure 3 of the drawings there is disclosed an angle of bank indicating instrument generally designated at 100 and comprising a gyrorotor 101 having horizontal spin axis mounted within a gimbal ring 102 which latter is mounted for angular movement about trunnions 103 and 104 suitably mounted within bearings (not shown) carried by the instrument casing generally designated at 105.

In place of the constraining springs 30, 31 and 45, 46 of Figures 1 and 2 a weight or pendulum 106 is provided upon the gimbal 102. The purpose of the weight lies in that during a turn at the proper angle of bank the centrifugal forces acting on the weight 106 neutralize the moment tending to precess the gyrorotor during craft turn. At the proper angle of bank for the turn, therefore, the gyrorotor does not precess but remains stationary thereby retaining a pointer 107 mounted on trunnion 104 in a set position. However, since the instrument casing 105 is mounted on the craft, relative movement takes place between the casing 105 carrying a scale 108 whereby relative movement between the scale 108 and pointer 107 is indicative of the angle of craft bank.

A resistor 109 similar in function to resistor 23 and the stator 52 of Figures 1 and 2 is provided upon the aft end of the casing 105 while trunnion 103 carries a slidable contact 110 similar to contact 25 of Figure 1 for engagement with the resistor. The resistor 109 is further provided with leads 111 and 112, similar to leads 18 and 18a of Figure 1, connecting the resistor to a suitable source of current and leads 111a and 112a for conveying current to the compensating coils. A lead 113 further connects the slidable contact 110 to the compensating coils in a manner illustrated and described in connection with Figure 1. Relative movement between resistor 109 carried by the casing and the slidable contact 110 during craft turn causes current to flow to the compensating coils in proportion to the angle of bank of the craft. The current flow in the structure of Figure 3 to the compensating coils is similarly modified in accordance with the angle of dip in the locality being travelled as heretofore described in connection with Figures 1 and 2.

A similar result may be accomplished, namely, the provision of a compensating field at the compass in accordance with the angle of bank of the craft, by use of an artificial horizon or gyro vertical such as that disclosed in Figure 4. In the latter figure a gyro rotor 115 is shown having vertical spin axis mounted within an inner gimbal ring 116, the latter in turn being mounted for angular movement about a horizontal axis perpendicular to the spin axis within an outer gimbal ring 117 having outer trunnions 118 mounting the assembly within a suitable casing (not shown).

Assuming the direction of craft flight to be in the direction of the arrow of Figure 4, the trunnions 118 journalled in the casing define the craft axis of bank while the inner gimbal trunnions define the craft pitch axis. Secured to the trunnions 118 is a slidable contact 119, similar to contact 110 of Figure 3, for engagement with a resistor 120 mounted upon the back plate of the gyro casing. Leads 121 and 122 connect the resistor 120 to a suitable source of current while leads 123 and 124 connect the resistor with the compensating coils. Contact member 119 also connects with the compensating coils by way of a lead 125. Contact 119 moves relatively with respect to the resistor 120 during a bank of the craft and current is caused to flow to the compensating coils in the manner described in connection with the preceding figures.

It will now become readily apparent to those skilled in the art that a novel compensating method and system have been provided for overcoming the undesirable effect introduced into magnetic compasses mounted on aircraft due to the vertical component of the earth's field present during turning of the craft. The compensating field produced by the system is a function of the angle of dip in the locality being flown and varies in proportion to the angle of bank of the craft during turning thereof when banked at the correct angle for each particular rate of turn. Obviously, with a slow turn the angle of bank is small and the vertical component of the earth's field is relatively small while during a rapid turn the angle becomes greater and the vertical component is likewise greater. When the craft is banked properly during turns, the precession of the rate of turn gyro is proportional to the angle of bank, and, accordingly, controls the field produced at the compass to neutralize the effect of the vertical component of the earth's field caused during turning.

Although four embodiments of the invention have been illustrated and described in detail, it is to be expressly understood that the same is not limited thereto. For example, the compensating field $H \sin \delta \sin \theta$ may be produced by any other convenient means such as, for example, by the use of permanent magnets adjacent the compass mounted horizontally on vertical shafts geared together to turn in opposite directions. Since the resultant field a short distance from the magnets is proportional to the sine of their deflection from the neutral position, the magnets may be rotated by a direct mechanical connection with the rate of turn gyro, or by a self-synchronous system, or any other suitable means. Various changes may also be made in the design and arrangement of the parts without departing from the spirit and scope of the invention as the same will now be understood by those skilled in the art. For a definition of the limits of the invention, reference will be had primarily to the appended claims.

What is claimed is:

1. A method of compensating a magnetic compass for northerly turning errors due to turning of the craft on which the compass is mounted, comprising the steps of producing a magnetic field at the compass opposing the effect of the vertical component of the earth's magnetic field, and varying the intensity of said produced field in accordance with the rate of turn of said craft.

2. A method of compensating a magnetic compass for northerly turning errors due to turning of the craft on which the compass is mounted, comprising the steps of producing a magnetic field at the compass opposing the effect of the vertical component of the earth's magnetic field, and varying the intensity of said produced field in accordance with the rate of turn of said craft and the angle of dip of the earth's magnetic field in the locality being flown by said craft.

3. Compensating means for a magnetic compass subject to northerly turning errors due to turning of the craft on which the compass is mounted, comprising means adjacent said compass for producing a compensating magnetic field at the compass opposing the effect of the vertical component of the earth's magnetic field means controlling the intensity of said compensating field in accordance with the rate of turn of said craft, and means for modifying the intensity of said compensating field in accordance with the angle of dip of the earth's magnetic field in the locality being travelled by said craft, whereby the total compensating field produced at the compass is equal and opposite to the effect of the vertical component of the earth's magnetic field.

4. Direction indicating means for an aircraft, comprising a compass mounted on said craft and subject to disturbing forces due to the vertical component of the earth's magnetic field during turning of said craft, means producing a magnetic field at the compass during energization thereof neutralizing the disturbing forces due to said vertical component, a source of electrical current, and controlling means including a rate of turn device variably controlling current flow from said sources to said magnetic field producing means for energization thereof in accordance with the rate of turn of said craft.

5. Direction indicating means for an aircraft comprising a compass mounted on said craft, and subject to disturbing forces due to the vertical component of the earth's magnetic field during turning of said craft, means producing a magnetic field at the compass during energization thereof neutralizing the disturbing forces due to said vertical component, a source of current, controlling means including a rate of turn device variably controlling the current flow from said source to said magnetic field producing means for energization thereof in accordance with the rate of turn of said craft, and means for modifying said current flow to said field producing means in proportion to the angle of dip of the earth's field in the locality being travelled by said craft.

6. Compensating means for a magnetic compass subjected to northerly turning errors due to turning of the craft on which the compass is mounted comprising means producing a compensating magnetic field at the compass opposing the effect of the vertical component of the earth's magnetic field, and a rate of turn device mounted on said craft for controlling the intensity of said compensating field in accordance with the rate of turn of said craft.

7. Compensating means for a magnetic compass subject to northerly turning errors due to turning of the craft on which the compass is mounted, comprising means producing a magnetic field at the compass opposing the effect of the vertical component of the earth's magnetic field, a rate of turn device mounted on said craft, and an electrical circuit having current flow therein controlled by said device and being connected with said magnetic field producing means whereby the intensity of said field is controlled in accordance with the rate of turn of said craft.

8. Compensating means for a magnetic compass subject to northerly turning errors due to turning of the craft on which the compass is mounted, comprising means for producing a magnetic field at the compass opposing the effect of the vertical component of the earth's magnetic field, and means including a rate of turn device mounted on said craft for controlling the intensity of said produced magnetic field in accordance with the rate of turn of said craft and the angle of dip of the earth's magnetic field in the locality being travelled by said craft.

9. Compensating means for a magnetic compass subject to northerly turning error due to turning of the craft on which the compass is mounted, comprising means for producing a magnetic field during energization thereof at the compass opposing the effect of the vertical component of the earth's magnetic field, a rate of turn device mounted on said craft, a source of current, electrical means carried by a portion of said device and movable thereby during turning of said craft for inducing current in said electrical means from said source in accordance with the rate of turn of said craft, a second electrical means adjustable in accordance with the angle of dip of the earth's magnetic field in the locality travelled by said craft and having current flow induced therein from said first-named electrical means, and means electrically connecting said second electrical means with said field producing means whereby the current flowing from said second electrical means energizes said field producing means to provide a magnetic field equal and opposite to the effect of the vertical component of the earth's field.

10. Compensating means for a magnetic compass subject to northerly turning errors due to turning of the craft on which the compass is mounted, comprising means for producing a magnetic field during energization thereof at the compass opposing the effect of the vertical component of the earth's magnetic field, a rate of turn device mounted on said craft, an inductive device comprising stator coils and a rotor coil, a source of current connected with said stator coils, said rotor coil being angularly movable with said device during turning of said craft for inducing current in said rotor coil in accordance with the rate of turn of said craft, a second inductive device having a rotor coil and stator coils connected with said first rotor coil, the rotor coil of said second inductive device having current induced therein in accordance with the current induced in said first rotor coil, means for adjusting said second rotor coil in accordance with the angle of dip of the earth's magnetic field in the locality travelled by said craft whereby current flow in said second rotor coil is proportional to the rate of turn and the angle of dip, and means connecting said second rotor coil and said magnetic field producing means to energize the latter thereby providing a magnetic field at said compass equal and opposite to the effect of said vertical component of the earth's field.

11. Compensating means for a magnetic compass subject to northerly turning errors due to turning of the craft on which the compass is mounted, comprising means for producing a magnetic field during energization thereof opposing the effect of the vertical component of the earth's magnetic field, a rate of turn device mounted on said craft, electrical means including stator coils and a rotor, a source of current connected with said stator coils, said rotor being angularly movable with said device during turning of said craft for inducing current in said rotor in accordance with the rate of turn of said craft, a second electrical means having a rotor and stator coils connected with said first rotor, the rotor of said second electrical means having current induced therein in accordance with the current induced in said first rotor, means adapted for manual operation for angularly adjusting said second rotor in accordance with the angle of dip of the earth's magnetic field in the locality travelled by said craft whereby current flow in said second rotor is proportional to the rate of turn and the angle of dip, and means electrically connecting said second rotor and said magnetic field producing means to energize the latter thereby providing a magnetic field at said compass equal and opposite to the effect of said vertical component of the earth's field.

PAUL A. NOXON.